Jan. 19, 1932.   J. L. DRAKE   1,841,717
GLASS MELTING FURNACE
Filed June 9, 1927
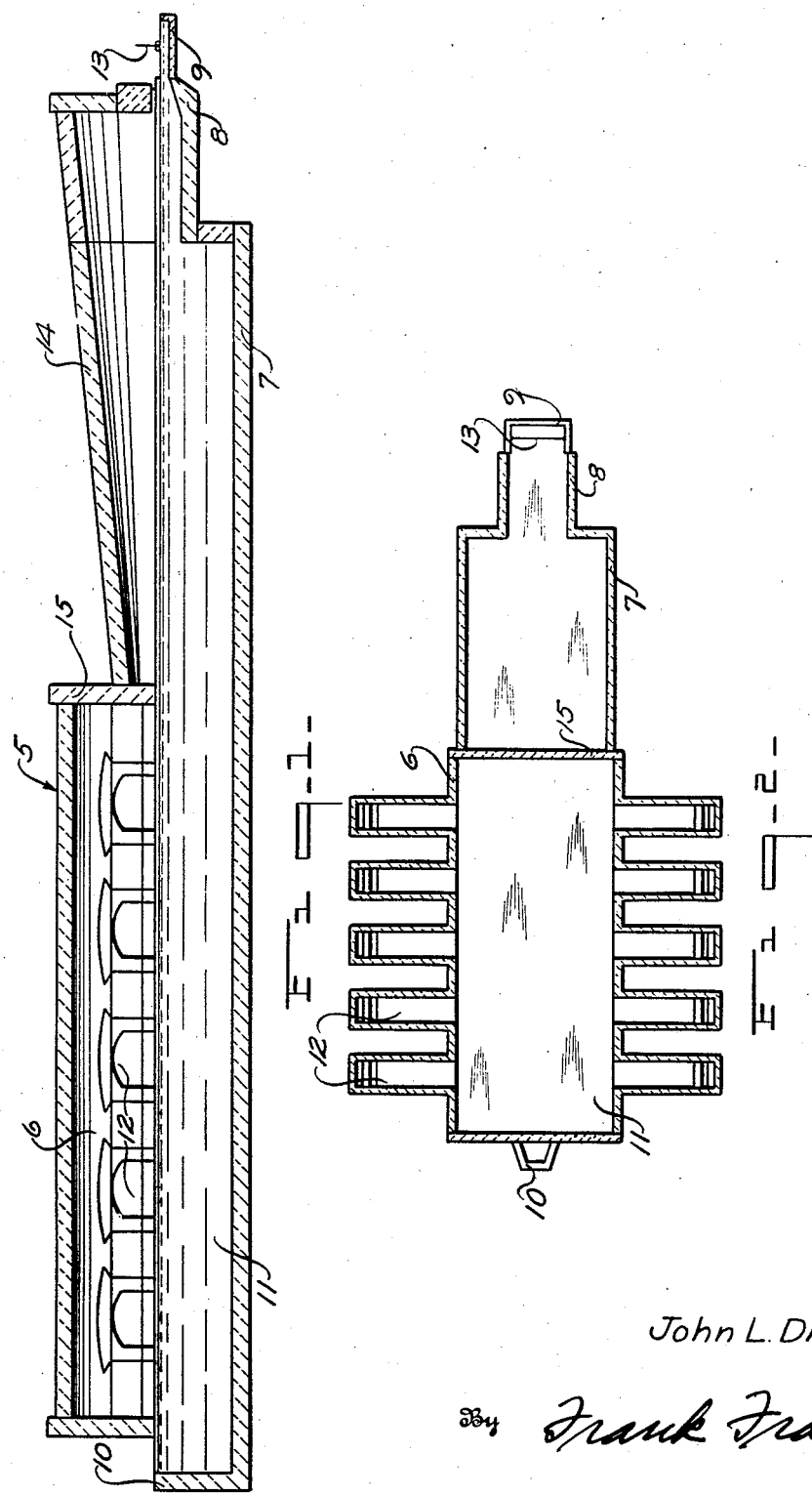
Inventor
John L. Drake
By Frank Fraser
Attorney Patented Jan. 19, 1932

1,841,717

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS MELTING FURNACE

Application filed June 9, 1927. Serial No. 197,538.

This invention relates to new and useful improvements in glass melting furnaces and particularly to furnaces of this type adapted primarily for supplying molten glass to sheet forming machines, although the improvements are also applicable to furnaces for supplying molten glass to machines for producing glass bottles or other glass articles.

An important object of the present invention is to provide a continuous tank furnace of improved construction wherein a slow uniform cooling of the molten glass contained therein is assured.

Another object of the invention is to provide such a continuous tank furnace wherein the heat from the molten glass is permitted to escape in gradually increasing volume as the said glass passes through the refining and cooling zones.

Still another object of the invention is to provide such a continuous tank furnace with means whereby the heat escaping from the molten glass will be radiated back thereupon, the amount of heat radiation being gradually decreased as the glass flows through the refining and cooling zones.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through an improved continuous tank furnace constructed in accordance with the present invention, and Fig. 2 is a horizontal longitudinal section therethrough.

In the drawings, the numeral 5 designates in its entirety a continuous tank furnace constructed in accordance with the present invention and including a melting chamber 6, a refining chamber 7, a cooling chamber 8 and a working receptacle or draw pot 9. The furnace 5 is provided at the melting end thereof with an open compartment or dog-house 10 for receiving the glass batch ingredients which are melted within the furnace to form the body or mass of molten glass 11.

This melting of the batch is preferably accomplished by means of flames issuing into the furnace alternately from one side thereof and then the other through ports 12. The flames issuing into the furnace at one side thereof exhaust through the ports 11 at the opposite side as will be readily understood.

In the operation of this type of furnace, the molten glass 11 after being produced within the melting chamber 6 is adapted to flow toward the forward end of the furnace through the refining chamber 7 and thence through the cooling chamber 8 into the receptacle or draw pot 9 from which it may be either drawn away in sheet form as indicated at 13 or formed into other glass articles as desired.

After the glass has been thoroughly melted within the melting tank or chamber 6, it is desirable to cool the same to a drawing temperature and that this cooling be uniform and gradual. It is the aim of the present invention to effect this gradual and uniform cooling of the molten glass as it flows toward the point of draw, the glass being hot at the melting end of the furnace and gradually cooling as it passes through the refining and cooling chambers into the working receptacle.

This is accomplished by providing the refining and cooling chambers 7 and 8 respectively with a sloping cap or roof 14, this roof inclining upwardly from the melting end of the furnace to the cooling end thereof. In other words, the space between the cap or roof 14 and the glass adjacent the melting chamber is relatively narrow and this space gradually increases toward the exit end of the furnace. Otherwise stated, the open space above the molten glass in the refining and cooling chambers constitutes a vault and this vault increases in cross section from the melting tank forwardly. Due to this gradually increasing area or space above the molten glass, the heat from the glass will be permitted to escape by degrees as the said glass passes through the refining and cooling zones. Since the cap is inclined, a greater and more rapid escape of heat from the glass will be permitted as it flows toward the point of removal. The hot air will rise to the top of the cooling chamber so as to make room for cooler air therebeneath. A wall 15 is positioned at the juncture of the melting tank 6 and refining chamber 7 to prevent the heated atmosphere in the former from passing into the latter and disturbing the temperature conditions therein.

Also, by sloping the cap 14 as shown, the amount of heat radiated back upon the glass will be gradually decreased from the melting end of the furnace to the drawing end thereof. Thus, at the melting end of the tank the cap is closer to the molten glass so that a relatively greater amount of heat will be radiated back upon the glass than at the cooling end where the cap is further removed from the molten glass. The closer the cap to the molten glass, the less heat will be permitted to escape while at the same time a greater amount of heat radiation will ensue.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A continuous tank furnace for producing molten glass, including a refining portion, and a sloping roof for said refining portion, said roof inclining upwardly from the inlet end of said refining portion toward the outlet end thereof.

2. A continuous tank furnace for producing molten glass, including a refining portion, and a sloping roof therefor, said roof inclining upwardly from the inlet end to the outlet end thereof.

3. A continuous tank furnace for producing molten glass, including a refining zone and a cooling zone communicating with said refining zone for receiving molten glass therefrom, and an inclined roof for said refining and cooling zones, said roof inclining upwardly throughout its length from the inlet end of the refining zone forwardly.

4. A continuous tank furnace for producing molten glass, including a refining chamber, said refining chamber having a vault above the molten glass therein, said vault increasing in cross section from the inlet end of the refining chamber to the outlet end thereof.

5. A continuous tank furnace for producing molten glass, including a refining zone and a cooling zone communicating with said refining zone for receiving molten glass therefrom, said refining and cooling zones including a continuous vault above the molten glass therein, said vault increasing in cross section from the inlet end of the refining zone to substantially the outlet end of said cooling zone.

Signed at Toledo, in the county of Lucas and State of Ohio, this 2nd day of June, 1927.

JOHN L. DRAKE.